United States Patent
Rangel

Patent Number: 5,516,117
Date of Patent: May 14, 1996

[54] DUAL-PURPOSE ARROW SHAFT INSERT

[76] Inventor: Louis Rangel, 11 N. 3175 East, Layton, Utah 84040

[21] Appl. No.: 326,064

[22] Filed: Oct. 18, 1994

Related U.S. Application Data

[63] Continuation of Ser. No. 180,220, Jan. 12, 1994, abandoned.

[51] Int. Cl.$^6$ ........................................ F42B 6/04
[52] U.S. Cl. ...................... 273/416; 403/288; 403/343; 403/320
[58] Field of Search ...................... 273/416, 419–422; 403/343, 288, 296, 299, 320, 372

[56] References Cited

U.S. PATENT DOCUMENTS

| | | | |
|---|---|---|---|
| 2,747,876 | 5/1956 | Teller | 273/420 |
| 3,741,542 | 6/1973 | Karbo | 273/422 |
| 4,029,319 | 6/1977 | Christen | 273/106.5 R |
| 4,050,696 | 9/1977 | Troncoso, Jr. | 273/420 |
| 4,141,554 | 2/1979 | Sherwin | 273/106.5 R |
| 4,210,330 | 7/1980 | Kosbab | 273/422 |
| 4,212,463 | 7/1980 | Repinski et al. | 273/422 X |
| 4,381,866 | 5/1983 | Simo | 273/422 |
| 4,504,063 | 3/1985 | LeBus | 273/422 |
| 4,706,965 | 11/1987 | Schaar | 273/416 |
| 4,722,531 | 2/1988 | Schram | 273/416 |
| 4,772,029 | 9/1988 | Watkins | 273/416 |
| 4,943,067 | 7/1990 | Saunders | 273/416 |
| 5,067,731 | 11/1991 | Bickel | 273/416 |
| 5,094,463 | 3/1992 | Dryden | 273/416 |
| 5,269,534 | 12/1993 | Saunders et al. | 273/419 |
| 5,306,020 | 4/1994 | Bolf | 273/416 |

OTHER PUBLICATIONS

Brochure, *Archery*, Easton, 1993–94 edition.

*Primary Examiner*—Paul E. Shapiro
*Attorney, Agent, or Firm*—Workman, Nydegger & Seeley

[57] ABSTRACT

A dual-purpose arrow shaft insert for pressing into a hollow arrow shaft at either end of the arrow shaft to facilitate the attachment of a nock or arrow point thereto. The insert has an introduction end, a receiving end, and a central cylindrical portion connecting the introduction end to the receiving end. A receiving orifice is formed within the receiving end and extends from the receiving end into the central cylindrical portion of the insert and terminates in a threaded opening which continues farther into the central cylindrical portion toward the introduction end. The receiving orifice is so sized and configured so as to be capable of receiving the shank of a nock. Without any modification, the dual-purpose insert may also receive a point through the receiving orifice. The threaded rod attached to the arrow point is thrust through a shock absorbing sleeve and both are then pressed into the receiving orifice. The arrow point is then rotated to engage the threaded rod into the threaded opening until the arrow point abuts the tip of the insert. The shock absorbing sleeve produces friction on the threaded rod to assist in the preventing of loosening of the point due to repeated impact.

1 Claim, 2 Drawing Sheets

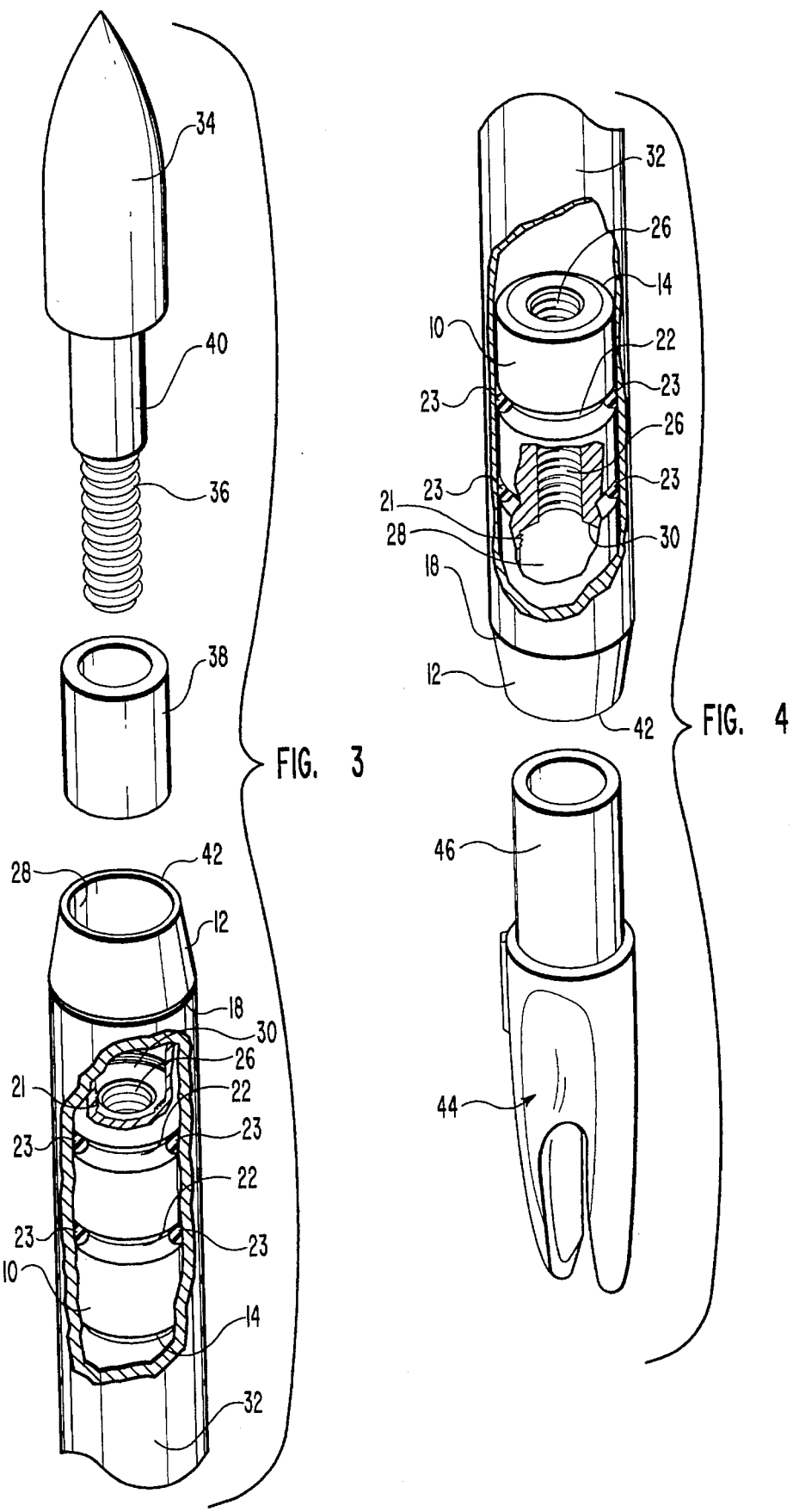

DUAL-PURPOSE ARROW SHAFT INSERT

This application is a continuation of U.S. application Ser. No. 08/180,220, filed Jan. 12, 1994, for DUAL-PURPOSE ARROW SHAFT INSERT, now abandoned.

BACKGROUND

1. Field of the Invention

The present invention relates generally to the field of archery and more specifically, to an insert capable of being utilized within either end of an arrow shaft to allow engagement of a nock or a point to the arrow shaft.

2. Background Art

Archery has served to provide sustenance and recreation since prehistoric times. Wooden arrows have been replaced with aluminum, fiberglass and carbon fiber arrows. While these new materials impart beneficial characteristics to modern arrows, some problems are also introduced.

For example, to properly cut a hollow aluminum arrow shaft to a length unique to each individual archer, special tools are required so as not to deform the shaft or create burrs at the cut end thereof. Due to the ever heightening standards of accuracy in archery, even a small burr left at the end of a cut arrow shaft may sufficiently affect proper positioning of a nock insert or a point insert enough that an unacceptable flight path could result.

Modern arrow shaft materials and the desire of most archers to change points from a practice point a broadhead point without great effort necessitate not only special cutting tools, but also special methods for attaching arrow points and nocks to the shaft.

When an individual wishes to attach a point to a modern arrow shaft, a point insert is typically glued into the point end of a hollow arrow shaft to provide a secure mounting base for a variety of points which then can be threaded into the insert. To glue the point insert into the arrow shaft the insert is typically heated along with a heat sensitive adhesive stick which is then applied to the insert before press fitting the insert into a heated hollow arrow shaft. Formed within the insert is a threaded aperture capable of receiving a variety of points. Some points are still glued directly into the arrow shaft but direct adhesion does not allow quick point changes in the field.

At the other end of the arrow shaft a nock must be assembled to the shaft. The majority of arrows now in use utilize a glue-in insert from which projects a swage. A nock having a hollow end corresponding in size and shape to the swage is then glued over the swage and permanently bonded. The disadvantage of this system, however, is that the nock may be rotated or "indexed" after it is glued onto the swage. To overcome this problem, inserts have been developed which are glued into the arrow shaft and then receive a nock having a shank in press fit engagement. Using this system, a nock insert and nock capable of receiving a bowstring are then attached to the arrow shaft in the same manner as the point end except the nocks are press fit into the nock insert to allow adjustment of the nock after insertion into the nock insert. Nocks must be rotated within the nock insert or "indexed" in order to obtain optimum flight characteristics when the arrow is released from the bow. During passage of the arrow over an arrow rest, portions of the fletching of the arrow come in contact with the arrow rest. By indexing the nock, the contact between the fetching and the arrow rest of the bow may be varied to reduce the effect of the contact on the flight path of the arrow.

Although these methods for attaching nocks and points to arrow shafts allow rapid changing of points and indexing of nocks, these attachment systems introduce their own problems. For example, when the point insert is inserted into the arrow shaft, even slight variations in the longitudinal axis of the point insert in relation to the longitudinal axis of the arrow shaft can result in an inaccurate flight path.

Because of the substantial impact which the point of a modern arrow undergoes due to higher flight speeds, vibration from the impact travels through the point into the metallic point insert and causes points to work loose. As the point vibrates loose, the point may alter the flight path of the arrow.

As nock inserts capable of receiving press nocks do not have any internal surfaces which can be gripped to remove the nock insert, archers wishing to salvage nock inserts from damaged arrows must attempt to remove the nock insert from a heated arrow with pliers. Unfortunately, the pressure required to remove the nock insert often results in deformation of the nock insert due to the pressure which must be applied by the pliers.

Because a different point insert and nock insert are required, both inserts must be purchased in a store.

In addition to adjusting the length of an arrow, other considerations such as balance and which form of fetching will be utilized must also be examined. For example, if the fetching on an arrow is changed from feathers to plastic vanes, the balance of the arrow will be altered by the heavier plastic vanes. The weight of the point insert and the nock insert will also affect the balance of the arrow. Although some bias toward the front of the arrow is desirable, too much bias in that direction may result in an arrow which has an erratic flight path. As the length of an arrow shaft depends upon the draw of the bow and the size of the archer, the length of the arrow should not be altered merely to correct an improperly balanced arrow. To alter the balance of an arrow without changing the length of the arrow some archers have placed weights near the nock insert to properly balance the arrow. The addition of weights to an arrow, however, obviates the benefits derived from the lightweight modern materials.

In addition, the adhesives used with current systems often scrape some of the adhesive off when inserts are pressed into the arrow shafts resulting in uneven application of the adhesive and premature failure of the joint. The current adhesive systems are also cumbersome as the user must heat a heat-sensitive adhesive stick and then paint the adhesive onto the insert prior to pressing the insert into the arrow shaft.

BRIEF SUMMARY AND OBJECTS OF THE INVENTION

It is, therefore, an object of the present invention to provide a dual-function insert which can be used at both the nock end and the point end of the arrow shaft.

Another object of the present invention is to provide an insert for the point of an arrow which will retain the point through repeated impacts.

A further object of the present invention is to provide an insert which can be easily altered to change the weight of the insert thereby assisting in balancing an arrow.

A still further object of the present invention is to provide an insert which aids in the application of an even coating of adhesive.

Yet another object of the present invention is to provide a nock insert which can be removed from the end of an arrow shaft without damaging the nock insert.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a dual function insert is provided. The insert is substantially cylindrical having a tapered introduction end opposite a tapered receiving end. The introduction end is tapered to assist in the insertion of the introduction end into the hollow arrow shaft. The receiving end is tapered to form a shoulder to stop the progress of the insert into the arrow shaft.

A central cylindrical portion of the insert extends between the introduction end and the receiving end. The diameter of the insert is so sized as to provide a fit within the inside of the hollow arrow shaft allowing only a thin layer of adhesive to be maintained between the outer diameter of the insert and the inner diameter of the hollow arrow shaft.

Formed within the receiving end of the insert is a receiving aperture. The receiving aperture performs several functions. When the dual function insert serves as a nock receiver, a portion of the nock is friction fit and also threaded within the receiving aperture. The receiving aperture is therefore so sized and configured so as to snugly receive a portion of a standard friction-fit nock. In addition, as the inner most portion of the receiving aperture is threaded, threaded nocks may be engaged within those threads to form an additional securing mechanism. The friction produced by the sides of the receiving aperture and the threaded portion is sufficient to maintain the nock in an indexed position while at the same time allowing the nock to be rotated with the application of a significant rotational force.

One advantage of having a portion of the receiving aperture threaded, is that the inventive nock insert may be removed from a damaged arrow shaft by placing a threaded point within the receiving aperture and engaging the threads and then pulling the nock insert from the arrow shaft. As the inner walls of prior art nock inserts are smooth, only external forces can be used to remove the nock and the application of those external forces often results in deformation of the nock insert. In contradistinction, the inventive nock insert, by utilizing the threaded portion of the receiving aperture, can be removed by applying pressure from inside the insert and the insert may be removed without deformation.

When used at the point end of an arrow shaft, the receiving aperture of the dual function insert has placed therein a shock absorbing sleeve through which a threaded rod of a point is pressed. At the rear of the receiving aperture a smaller threaded orifice is formed. After being pressed through the sleeve, the threaded rod of the arrow point is then engaged in the threaded orifice. The shock absorbing sleeve absorbs some of the vibration occurring when the point of an arrow impacts an object and also produces friction on the threaded rod of the point thereby reducing the tendency of the point to vibrate loose or rotate within the receiving aperture.

Formed within the outside of the cylindrical portion of the insert are two adhesive grooves. The adhesive grooves serve several purposes. The first purpose is to hold an adhesive O-ring and to evenly spread the adhesive as the insert is pressed into the hollow arrow shaft. The second purpose served by the adhesive grooves is as a frangible juncture so that a portion of the insert may be easily snapped off to reduce the weight of the insert to aid in balancing an arrow shaft.

In addition to allowing an archer to balance an arrow shaft, the frangible junctures may also be used to reduce the weight of the insert should the archer be seeking the lightest possible arrow. As a weight savings of approximately six to nine grams is accomplished, this reduction of weight can, in some instances be significant.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 3 is an exploded view of an arrow shaft having the insert of FIG. 1 inserted therein ready to receive a point; and FIG. 4 is an exploded view of an arrow shaft having the insert of FIG. 1 inserted therein ready to receive and a nock.

DETAILED DESCRIPTION OF THE PREFERRED EMBODIMENTS

Figure 1:
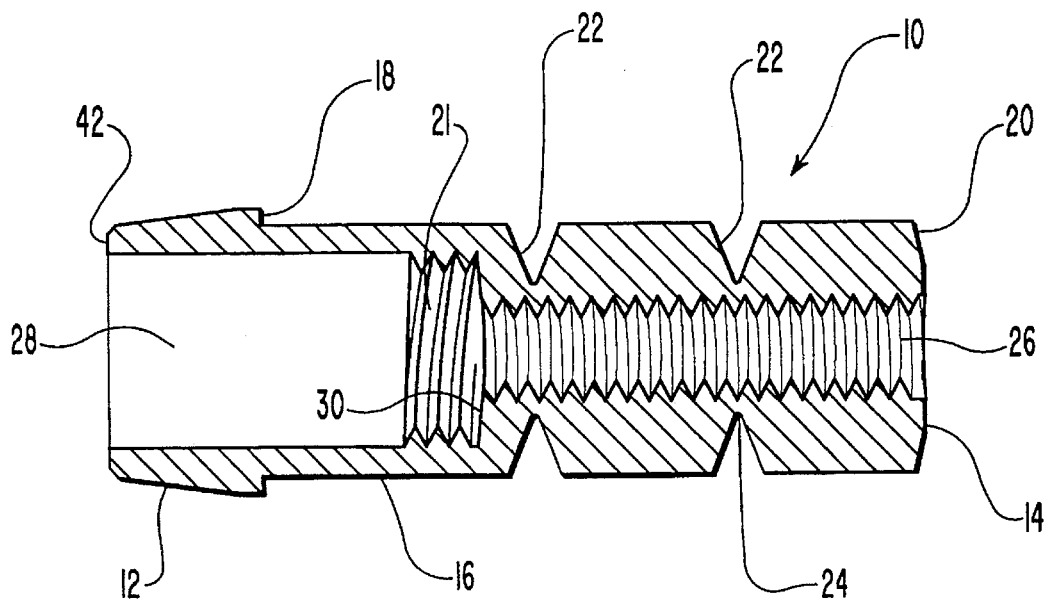
FIG. 1 is a cross-sectional elevational view of the dual purpose insert.

Referring first to FIG. 1, an insert generally shown as 10 is illustrated. Insert 10 has a receiving end 12, an introduction end 14, and a central cylindrical portion 16. A small portion of the diameter of central cylindrical portion 16 corresponds closely to the internal diameter of an arrow shaft. Because the insert is tapered, the area closest to the receiving end is larger and fits tighter than the introduction end. This tapering allows some adhesive to adhere to the insert and serves to center the insert within the shaft. In many instances, the cylindrical portion may have a diameter which closely approaches the inside diameter of an arrow shaft. The close tolerance between the outside of the central cylindrical portion and the inside of the arrow shaft allows for a thin layer of adhesive which is used to maintain the insert within the arrow shaft.

Receiving end 12 is beveled from its tip and gradually increases until the diameter of the receiving end abruptly changes at a shoulder 18 back to the diameter of the central cylindrical portion 16. Shoulder 18 serves as a stop to halt the progress of the insert as the insert is pressed into the arrow shaft. Introduction end 14 has a taper 20 which serves to aid in the insertion of introduction end 14 into the arrow shaft.

In the embodiment illustrated in FIG. 1, two adhesive grooves 22 are formed within central cylindrical portion 16. The adhesive grooves perform many functions. The first function of adhesive groove 22 is to retain a quantity of adhesive as the central cylindrical portion is pressed into the arrow shaft. Because of the interference fit between the insert and the arrow shaft, only a very thin layer of adhesive remains and the rest of adhesive is scraped away. By maintaining a quantity of adhesive in the adhesive groove, the groove serves as a reservoir to apply a thin layer of adhesive as the insert travels through the inside of the shaft.

Figure 2:
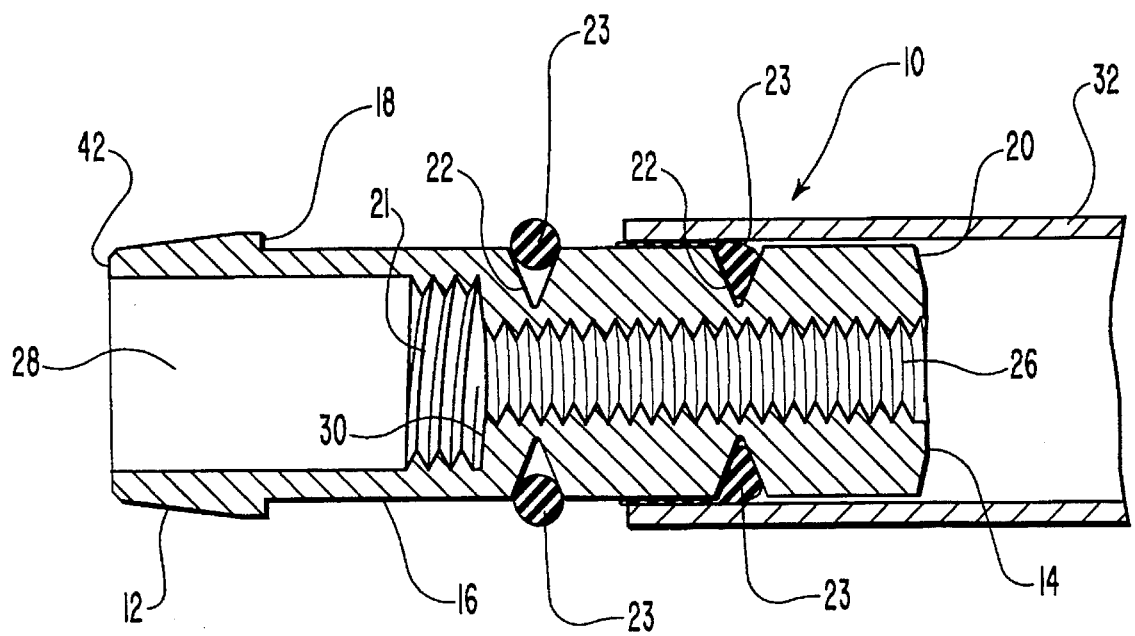
FIG. 2 is a cross-sectional view showing the insert being partially inserted into an arrow shaft.

Another function of the adhesive groove is to hold adhesive O-rings during shipment and during heating of the O-rings prior to insertion. For example, as illustrated in FIG. 2, when a user wishes to assemble the insert into the arrow shaft, an adhesive O-ring 23 is placed into lower adhesive groove 22. The insert and adhesive O-rings are then heated and the arrow shaft is warmed to prevent shock and deformation. The insert is then pressed into arrow shaft 32 and as arrow shaft 32 makes contact with adhesive O-ring 23, an even layer of adhesive is spread as the insert is further pressed into the arrow shaft. FIG. 2 illustrates the reservoir function of adhesive O-ring 23 after partially pressing insert 10 into arrow shaft 32. The remaining adhesive O-ring is illustrated in an unheated state.

This even application of adhesive should be contrasted with the typical methods of applying archery adhesive. For example, most archers are required to purchase adhesive in a stick which then must be heated, melted and painted on to the insert just prior to pressing of the insert into the arrow shaft. Painting or dipping of adhesive often resulted in uneven applications of adhesive which result in poor bond strength.

A further purpose of adhesive groove 22 may be used when balancing an arrow. The innermost point of adhesive groove 22 forms a break point 24. Break point 24 is in close proximity to a threaded opening 26. As a result, a weak area is produced at break point 24 which allows a segment of the insert to be snapped off. As not all portions of the insert are required in all applications, the weight of the insert can be varied to aid the archer in balancing the arrow.

Formed within receiving end 12 is a receiving orifice 28. Receiving orifice 28 ends in a tapered region 30 with threads 21 and communicates with threaded opening 26 to form a channel passing completely through the insert from receiving end 12 to introduction end 14. Threads 21 may serve to engage nocks having a threaded portion of the end of the nock shank or smooth shank nocks constructed of materials which allow threads to be cut or formed as the nock is inserted and rotated.

The utilization of insert 10 as a point insert is illustrated in FIG. 3. Insert 10 is shown properly situated within an arrow shaft 32. Projecting from an arrow point 34 is a threaded rod 36. When an archer wishes to assemble arrow point 34 to arrow shaft 32, threaded rod 36 is pressed through a shock absorbing sleeve 38 which is hollow. Shock absorbing sleeve 38 is so sized and configured so as to be snugly received within receiving orifice 28 against the outer diameter of the shock absorbing sleeve while at the same time snugly fitting around threaded rod 36 so as to produce friction against threaded rod 36. By pressing threaded rod 36 through shock absorbing sleeve 38 and placing shock absorbing sleeve 38 in receiving orifice 28, a snug fit is thus obtained between those three structures.

When one end of shock absorbing sleeve 38 encounters tapered region 30, a back 40 of arrow point 34 will still be some distance from receiving end 12. By concomitantly pressing and rotating arrow point 34 and therefore threaded rod 36 further into receiving orifice 28, the threaded rod will contact threaded opening 26. The threads within threaded opening 26 correspond to threads on the outside of threaded rod 36 and allow threaded rod 36 to be screwed into threaded opening 26. Arrow point 34 is then screwed into the threaded opening until a back 40 of arrow point 34 encounters a tip 42 of receiving end 12.

Shock absorbing sleeve 38 functions both to absorb vibration from repeated impact of the arrow point and also serves to produce friction against threaded rod 36 to prevent loosening of arrow point 34 from insert 10.

The same insert illustrated in FIG. 3 as a point insert can also be utilized as a nock insert. As shown in FIG. 4, a nock 44 having an insertion shaft 46 can be assembled into insert 10 with no modification of the insert. Although the nock would always be installed in another insert at the other end of the arrow shaft, it is important to appreciate the dual-function of insert 10 as compared to other insert systems which require a different insert for the point end and the nock end of an arrow shaft. Receiving orifice 28 has an inside diameter which is slightly smaller than the outside diameter of insertion shaft 46. As a result, a friction fit and a threaded connection are established upon insert of nock 44 into insert 10. By exerting a significant rotational force, however, nock 44 may be rotated within receiving orifice 28 to "index" the nock to the arrow shaft. Under normal conditions, however, sufficient frictional force is exerted by receiving orifice 28 to prevent rotation of nock 44.

It should be appreciated from the foregoing, that the dual-function insert provides the advantage that only one type of insert need be stored and purchased to perform the functions formerly performed by a nock insert and a point insert. Another advantage of the dual-function insert is that, due to the shock absorbing sleeve, the inventive insert will serve to retain the point in the insert for a longer period. If modifications are made to arrow shaft such as change in the weight of the fetching, one segment of the insert may be easily snapped off to lighten the insert and thereby aid in balancing the insert. The adhesive grooves formed in the insert not only aid in balancing the arrow by providing break points, but also serve to assist in the application of an even coating of adhesive as the insert is pressed into the arrow shaft. This even coating of adhesive provides for a stronger bond between the insert and the arrow shaft and also aids in the proper alignment of the insert within the shaft.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An arrow point attaching system for attaching an arrow point to an arrow shaft, the system comprising:
   a) an arrow point having a threaded shaft extending therefrom;
   b) a compression sleeve so sized and configured so as to slide over a portion of the point shaft;
   c) an arrow shaft insert, the arrow shaft insert comprising:
      i. an introduction end;
      ii. a receiving end located opposite the introduction end;
      iii. a central cylindrical portion between the receiving end and the introduction end;
      iv. a receiving aperture having a wall formed within the receiving end, the wall extending from the receiving end into the central cylindrical portion, the receiving aperture terminating in a threaded opening which extends further through the central cylindrical portion towards the introduction end, the receiving aperture being so sized and configured so as to be capable of receiving the threaded shank of the point therethrough, the receiving aperture also being so sized and configured so as to receive the compressible sleeve when the compressible sleeve is slid over the threaded shank of the point prior to insertion of the shank and compression sleeve into the insert; and v. V-shaped break points formed around the outer surface of the shaft insert to a depth from the outer surface of at least one-third the distance between the outer surface and the threaded opening thereby allowing a segment of the insert to be easily severed from the remainder of the insert without deforming the insert thereby reducing the weight of the insert before the insert is introduced into the arrow shaft; and d) adhesive rings formed into the shape of O-rings so sized and configured so as to be capable of being slid over the shaft insert and lodging in the break points, the O-rings then being heated prior to insertion of the insert into the hollow arrow shaft.

* * * * *